United States Patent [19]

Takemura et al.

[11] Patent Number: 4,744,070
[45] Date of Patent: May 10, 1988

[54] OPTICAL DISK AND METHOD OF TRACKING THE SAME

[75] Inventors: Yoshinari Takemura, Osaka; Kazuaki Obara, Kadoma; Michiyoshi Nagashima, Hirakata, all of Japan

[73] Assignee: Matsushita Electric Industrial Co., Ltd., Osaka, Japan

[21] Appl. No.: 729,933

[22] Filed: May 3, 1985

[30] Foreign Application Priority Data

May 7, 1984 [JP] Japan ................................. 59-90520

[51] Int. Cl.⁴ ............................................. G11B 7/095
[52] U.S. Cl. ....................................... 369/44; 369/46; 250/202
[58] Field of Search ................... 369/44, 46, 111, 121, 369/122, 47; 250/202, 204

[56] References Cited

U.S. PATENT DOCUMENTS

| | | | |
|---|---|---|---|
| 3,876,842 | 4/1975 | Bourhuis | 369/44 |
| 3,999,008 | 12/1976 | Bourhuis | 369/44 |
| 4,310,916 | 1/1982 | Dil | 369/109 |
| 4,325,135 | 4/1982 | Dil | 369/110 |
| 4,534,021 | 8/1985 | Smith | 369/47 |
| 4,569,038 | 2/1986 | Nagashima | 369/44 |

FOREIGN PATENT DOCUMENTS

| | | | |
|---|---|---|---|
| 57-147133 | 4/1983 | Japan | 369/111 |
| 58-175259 | 7/1983 | Japan | 369/111 |

OTHER PUBLICATIONS

"Proc. of ICO 13", Sapporo (1984).

Primary Examiner—Alan Faber
Attorney, Agent, or Firm—Stevens, Davis, Miller & Mosher

[57] ABSTRACT

An optical disk having V-shaped grooves with depths periodically varied at a frequency f for every two grooves, thus realizing a large recording area on each slant of the grooves. A tracking method for the optical disk in which two laser spots irradiate two adjoining slants of a V-shape groove, and pilot signals are made of components of the frequency f which are detected from the reflected beams of the respective two laser spots on the optical disk, and whereby the tracking is performed by controlling so as to make the magnitudes of the two pilot signals become equal to each other.

6 Claims, 6 Drawing Sheets

FIG. I  PRIOR ART
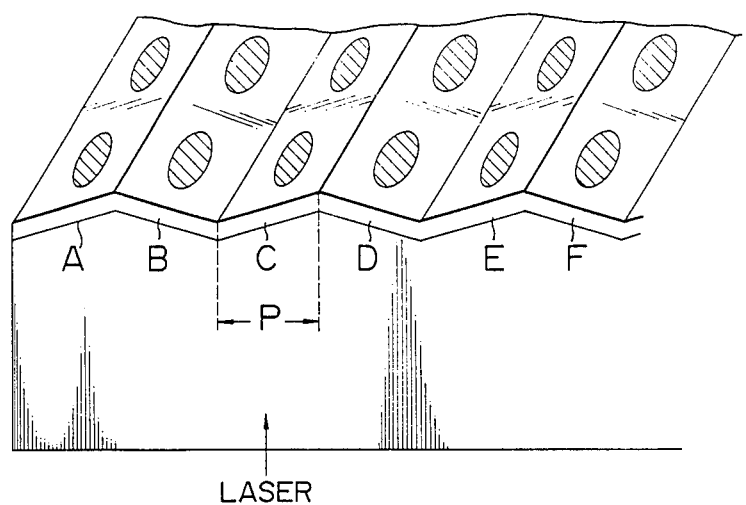
FIG. 2  PRIOR ART
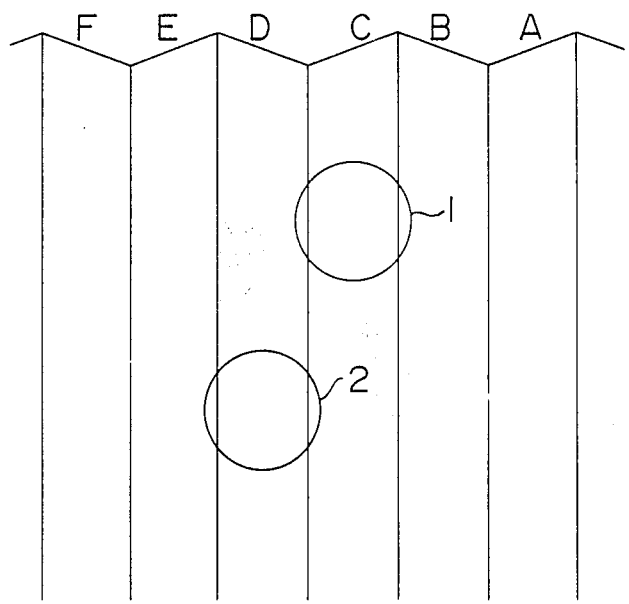

OPTICAL DISK AND METHOD OF TRACKING THE SAME

BACKGROUND OF THE INVENTION

1. Field of the Invention

The present invention relates to an optical disk and a method for recording and reproduction of various information on a recording medium such as an optical disk by directing laser beams onto the recording medium, and more particularly it relates to an optical disk and a method of tracking on the disk wherein the recording and reproduction with a high density and a high transfer rate can be realized by narrowing the track pitch of the optical disk.

2. Description of Prior Art

Various optical disk devices have recently been proposed for recording and reproduction of many types of information on the disk by using laser beams. The recording density and transfer rate however have not been greatly improved. The reason for this is that a space of about a laser wavelength is commonly provided between tracks in order to suppress crosstalk between tracks. In view of the above, a recording and reproduction method for doubling the recording density and transfer rate by removing the space between tracks has been proposed (Japanese patent application No. 57-147133). In the method, the cross section of tracks along the radial direction of the disk is formed to have V-shape grooves, and two focussed laser spots are independently driven and projected onto the two adjoining slants on both sides of a V-shape groove in order to record and reproduce signals.

FIG. 1 shows a perspective view of a cross section cut along the radial direction of an optical disk having V-shape grooves. Onto the central portions of two adjoining slants such as A and B, or C and D in FIG. 1, laser spots 1 and 2 are projected as shown in FIG. 2. By driving the two laser beams independently from each other, it is possible to record separate signals on the two slants.

Next, a method of reproducing signals recorded as above will be described in brief. FIG. 3 is a sectional diagram of FIG. 2 as cut along the radial direction of the disk. Similarly to FIG. 2, laser spots 1 and 2 (which are depicted as a laser beam intensity distribution in FIG. 3) are projected on the slants C and D, the distance P between the centers of the spots being arranged to be maintained constant. As disclosed by the above Japanese patent application, by properly setting the shape of V-grooves and detecting mainly ±1st-order diffraction beams among the beams reflected from the disk, it is possible to reproduce respective signals from the slants. The distribution of reflected light beams in the above case is shown in FIG. 5(a). Numeral 3 represents the surface of a lens (exit or entrance pupil) which focusses laser beams onto the disk. In the case that a reproducing laser beam is projected only at the central portion of the lens surface (entrance pupil), the distribution of 0-order diffraction beam $E_O$ and ±1st-order diffraction beams $E_{+1}$, $E_{-1}$ among the light beams reflected from the disk on the lens surface (exit pupil) is as shown in FIG. 5(a). Therefore, by disposing photosensors A and B as shown in FIG. 5(b), for example, and detecting reflected lights at the respective peripheral portions of the reflected light beam 4, each signal recorded on each slant can be independently reproduced.

Next, a tracking method in the above described recording and reproducing method will be explained (as disclosed by Japanese patent application No. 58-17529; U.S. patent application No. 525,411 was filed on the basis of the two Japanese application Nos. 57-147133 and 58-175259). The sectional view of an optical disk for use with the tracking method is shown in FIG. 3. As shown in FIG. 3, the top or uppermost portions of V-shape grooves are formed such that the depths of the grooves are made to slightly vary at two different frequencies f1 and f2 alternately in order to constitute pilot signals. These frequencies are set for example lower than the frequencies of signals recorded on the slants. The intensities of lights reflected from the disk are respectively modulated by the frequencies f1 and f2. In particular, if a tracking laser spot deviates toward the slant E of FIG. 3, the reflection beam includes an increasing component modulated by the frequency f2 and a decreasing component modulated by the frequency f1. Conversely, if a tracking laser spot deviates toward the slant B in FIG. 3, the component of f1 increases and the component of f2 decreases. Accordingly, by controlling the reflection beams so as to include equal amounts of components varying at the two frequencies f1 and f2, the two laser spots can correctly track on the slants C and D. In the laser spots' tracking on the slants A and B, it is necessary to reverse the polarity of the control because, as shown in FIG. 3, the right and left positional relation of the slants B and A for the respective frequencies f1 and f2 is made contrary to that of the slants C and D.

On this account, in the case of a disk having spiral tracks, in order to change the tracking control polarity for every one track, signals must be provided for indicating the positions where the control polarity is changed. One example of a disk having spiral tracks is shown in FIG. 4. The solid line indicates the bottom of the V-shaped groove along which the middle point of two laser spots traces. As seen from the figure, the tracks change their depths at the frequencies f1 and f2 alternately at every revolution of the disk. An area W is provided to form the V-shaped grooves varying their depths at a third frequency f3 so that upon detection of the frequency f3 from the reflected beams, the switching of tracking control polarity can take place. This method however has a problem of unstable tracking since the tracking control in association with the frequencies f1 and f2 can not be performed in the area W. Further, with the method, detection means must be provided for detecting from the reflected beams the three kinds of frequency components f1, f2, and f3. As a result, a circuit arrangement of large scale is required and it is not suitable from the view point of cost. In addition, the formation of such tracks with groove depths modulated by three frequencies becomes one of the factors complicating the manufacturing process of the disks.

The method incorporating therein the switching of tracking control has such problems. Therefore, a development on tracking methods without the control switching has long been desired..

FIG. 6 shows a cross sectional view including slants C and D. In FIG. 6, P represents a track pitch, e.g., P=800 nm. $\theta$ represents an angle between the slants C and D, e.g., $\theta = 163°$. In this case, if the depths of respective slants are varied at frequencies f1 and f2 and with an amplitude of $\delta = 30$ nm, then the juncture line between the slants C and D shifts with an amplitude γ=300 nm in the radial direction of the disk and it wobbles with revolution of the disk. Therefore, the practical width of available recording area becomes R=700 nm which is narrower by 12.5% than the track pitch P. As mentioned above, the method changing the depth of every track has a disadvantage that the practically available recording area becomes smaller.

SUMMARY OF THE INVENTION

The present invention has been made in view of the above problems, and it is an object of the present invention to provide a tracking method which can make broader the recording area on a slant and which does not incorporate the switching of tracking control, and to provide an optical disk suitable for the tracking method.

The present invention uses an optical disk constructed such that the depths of V-shape grooves of the optical disk are periodically varied at a frequency f for every other one groove. Pilot signals are made of components of frequency f which are detected respectively from the reflected beams from two laser spots and a tracking control is made so as to have these two pilot signals of equal magnitudes, so that, without changing the control polarity, the tracking control makes it possible to project the two laser spots onto the corresponding slants of the V-shape grooves.

BRIEF DESCRIPTION OF THE DRAWINGS

FIG. 1 is a perspective view of an optical disk having V-shape grooves, with a cross section cut along the radial direction of the disk, FIG. 2 is a diagram showing a positional arrangement of laser spots on the optical disk.

DESCRIPTION OF THE PREFERRED EMBODIMENT

The present invention will now be described with reference to the accompanying drawings.

Figure 6:
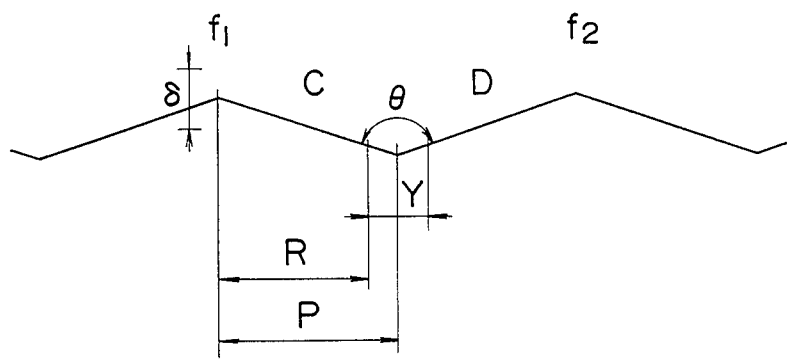
FIG. 6 is a schematic diagram showing the configuration of V-shape grooves according to the prior art, FIGS. 7(a) and (b) show schematic diagrams showing the configuration of V-shape grooves according to the present invention, FIGS. 8(a) and (b) show the relation of position of laser spot and magnitude of a pilot signal.
Figure 7:
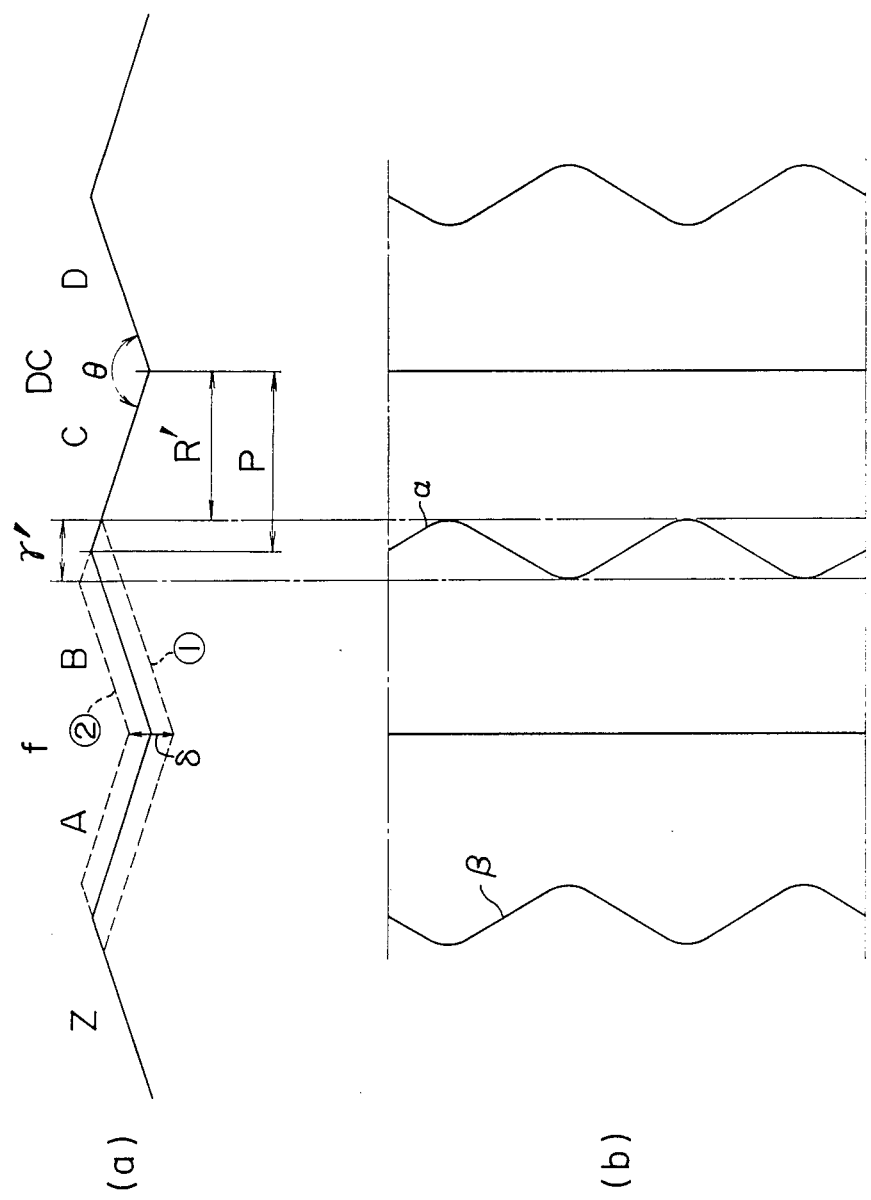

FIG. 7(a) shows a cross sectional view of an optical disk cut along the radial direction of the disk according to the present invention, and FIG. 7(b) shows a plan view thereof. According to the invention, the pilot signal of frequency f is recorded every other one groove on the optical disk by varying the groove depth. For example, as shown in FIG. 7(a), the depth of a groove defined by slants A and B is varied at the frequency f and with an amplitude 6, while the depth of the next groove defined by slants C and D is made constant (direct current DC). By lowering the slants A and B by $\delta/2$, the juncture point of the slants B and C shifts by $\gamma'/2$ towards the side of slant C as indicated by the dashed line ①. By raising the slants A and B by $\delta/2$, the juncture point of the slants B and C shifts by $\gamma'/2$ towards the side of slant B as indicated by the dashed line ②. In this way, by modulating the depth or height of the slants A and B by the pilot signal of frequency f, the ridge lines α and β change at the frequency f and with the amplitude γ as indicated in FIG. 7(b), which ridge lines are the juncture lines of the slants B and C and of the slants Z and A respectively. As one example, similarly to the case shown in FIG. 6, if the track pitch P=800 nm and θ=163°, and amplitude δ=30 nm are assumed, then the juncture line (ridge line α) between slants B and C periodically shifts with an amplitude $\gamma'=100$ nm in the radial direction of the disk and the ridge line wobbles along the track. Thus, the width of a recording area R becomes R'=750 nm which is narrower by 6.25% than the track pitch P. That is, the area which does not serve on the track is reduced by one half as compared with the conventional optical disk shown in FIG. 6.

Next, a method for performing the tracking control will be described by using the optical disk described above.

Figure 3:
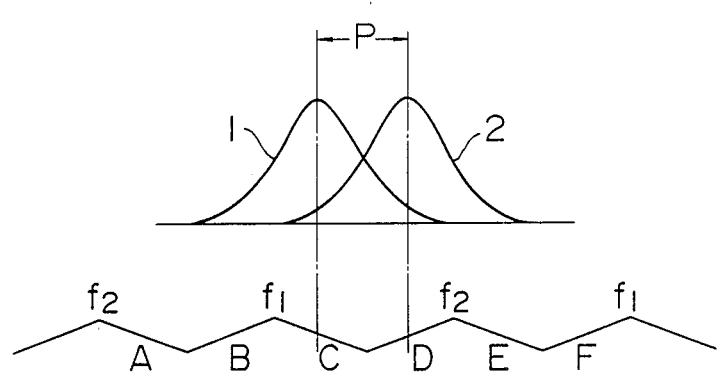
FIG. 3 is a cross sectional view of an optical disk for use with a prior-art tracking method.
Figure 4:
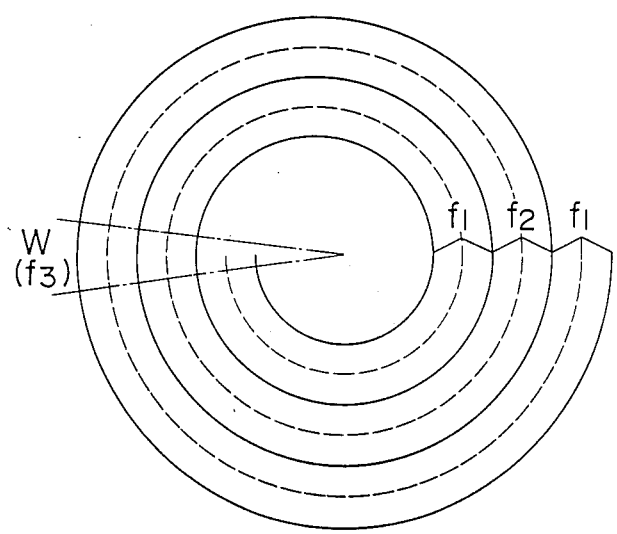
FIG. 4 is a schematic diagram showing V-shape grooves of an optical disk according to the prior art, FIGS. 5(a) and (b) are diagrams illustrating the distribution of beams reflected from the V-shape grooves of the optical disk and the positional arrangement of reproducing photodetectors.
Figure 5A:
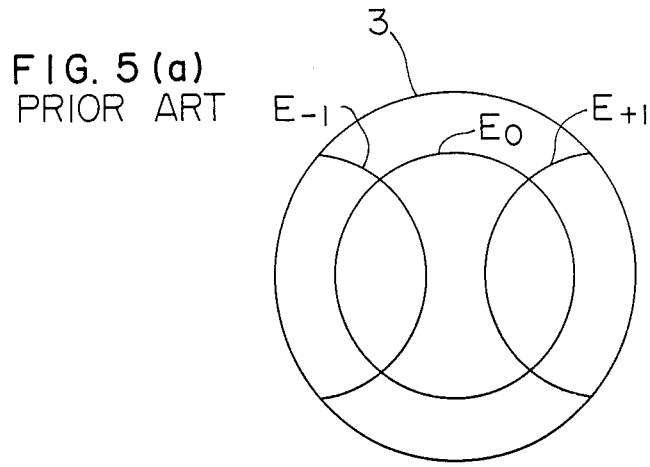
Figure 5B:
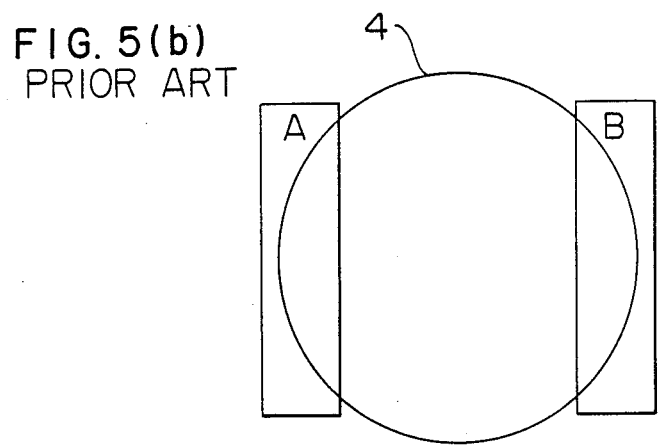
Figure 8:
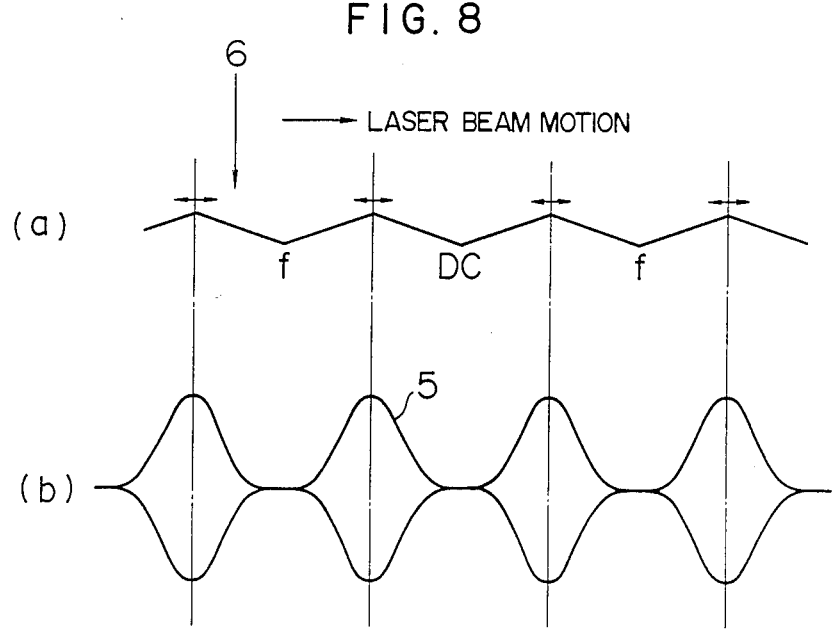

The intensities of beams reflected from the respective laser spots are changed at the frequency f. The components of frequency f are detected from the reflected beams to make the pilot signals. The magnitudes of the pilot signals change dependent upon positions of the laser spots on slants. Exemplarily regarding one laser spot 6 moving across a V-shape groove, FIGS. 8(a) and (b) show the relation of the center position of the laser spot 6 and the magnitude of the pilot signal derived from the reflected beam. In FIG. 8(b), 5 designates an envelop of the pilot signal. As shown, the amplitude 5 of the pilot signal takes the maximum value when the center of the laser spot is put on the top portion of the V-shape groove and takes the minimum value when the center of the laser spot is put on the bottom portion of the V-shape groove. This phenomenon is caused for laser interference and also for the fact that the radial amplitude change γ of the groove top portion is larger than the amplitude change δ of the groove bottom portion. The present invention performs the tracking control utilizing these characteristics.

Figure 9:
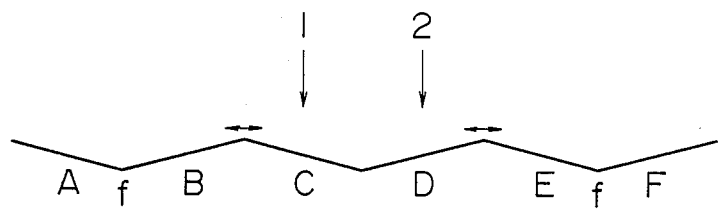
FIG. 9 is a graph for explaining a tracking method according to the present invention FIG. 10, consisting of A through F, illustrates light detectors, frequency detectors and a tracking control device, and FIG. 11, consisting of A through F, illustrates inverted trapezoidal grooves.

For instance, as shown in FIG. 9, it is assumed here that two laser spots 1 and 2 are projected on slants C and D. If the spots are deviated toward slant E, the amplitude of the pilot signal for the spot 2 becomes larger and the amplitude of the pilot signal for the spot 1 becomes smaller. Conversely, if the spots are deviated toward slant B, the pilot signal amplitude for the spot 1 becomes larger and the pilot signal amplitude for the spot 2 becomes smaller. Therefore, by controlling both pilot signal amplitudes respectively obtained from the two spots so as to make then equal to each other, the two laser spots can be made to track on the slants C and D respectively. In the case two spots are projected onto slants A and B, entirely the same tracking control as in the case of the slants C and D suffices (the experimental results with this tracking method was reported on Proc. of ICO 13. Sapporo '84 (1984)).

In the present embodiment, although the tracking control has been performed along the bottom of the V-shape groove, it is also possible to perform the tracking control along the top of the V-shape groove, that is, in such a way for the laser spots to irradiate the slants B and C of FIG. 9 for example.

Figure 10:
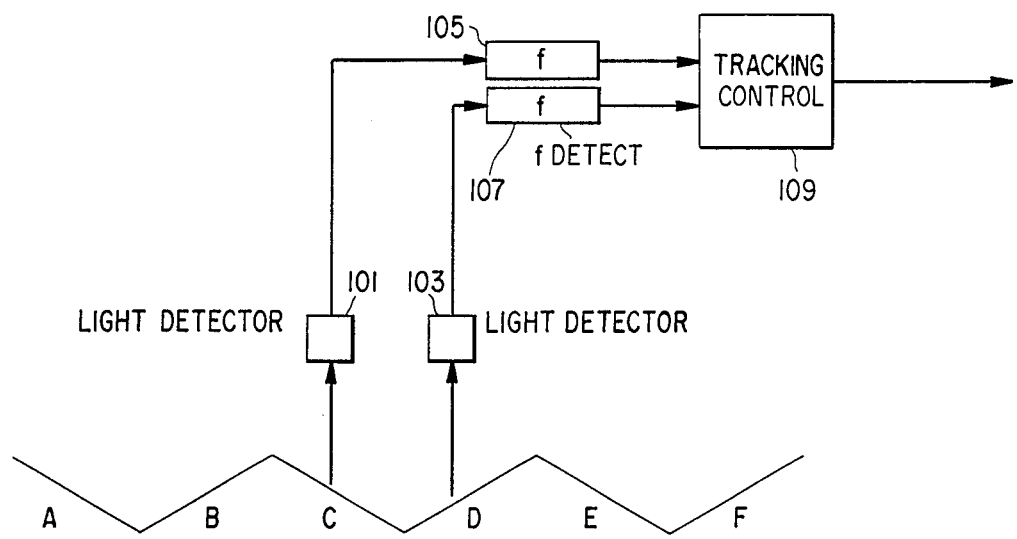

FIG. 10 shows the reflected beams for the optical disk, as well as light detectors 101, 103 and frequency detectors 105, 107 and a tracking control device 109 which is responsive to the amplitude output of frequency detectors 105, 107.

Figure 11:
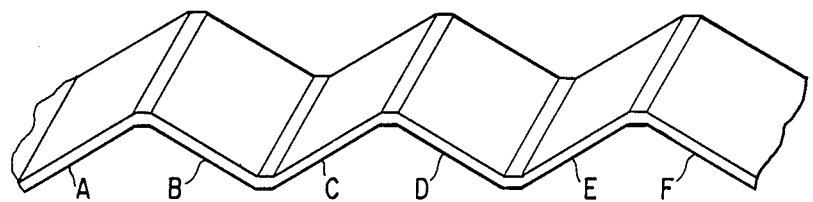

Furthermore, although the above description has been given using a V-shape as the configuration of the groove, it is not intended to be limited thereto. For example, the present invention is also applicable to the groove of an inverted-trapezoidal shape (FIG. 11).

In order to perform recording and reproduction of information data signals on the two slants of the V-shape groove by using the optical disk described above, a similar method as described with reference to the prior art is applicable.

As seen from the above description of the present invention, an optical disk capable of having a large recording area on the slant can be realized by periodically varying the depths of the V-shape grooves of the optical disk at a frequency of f for every two tracks. Furthermore, the polarity control is not required since the tracking control is performed by detecting the signal components of the frequency f from the respective reflected beams of the two laser spots and by making the amplitudes of the two detected signals equal to each other. In addition, since a tracking circuit can suffice if it can detect substantially only the components of frequency f, the circuit arrangement can be made of small scale which is very advantageous in practical use.

We claim:

1. A tracking method for an optical disk formed to have adjacent tracks in the form of grooves, each of said grooves having two slanted surfaces respectively disposed on opposite sidewalls of said groove, the depth of a first plurality of said groove which constitutes every other one of said grooves being varied at a frequency f and the depth of a second plurality of grooves which constitute the remaining grooves being substantially constant, said method comprising the steps of:
   irradiating two successive slanted surfaces of said optical disk with two independently driven focussed spots of light to perform one of a recording and reproducing operation independently on said two successive slanted surfaces,
   detecting the magnitude of respective frequency components from beams reflected from said two successive slanted surfaces corresponding to said two spots of light, and
   controlling the position of said two spots of light relative to said optical disk so that the magnitudes of the detected frequency components corresponding to said two spots of light are equal to each other.

2. A method as in claim 1, wherein said two spots of light are laser beams.

3. A method as in claim 2, wherein said grooves have a V-shape along a radial direction of said disk.

4. A method as in claim 2, wherein said grooves have a shape of an inverted-trapezoid along a radial direction of said disk.

5. A method as in claim 2, wherein said two slanted surfaces which are irradiated are part of the same groove.

6. A method as in claim 2, wherein said two slanted surfaces which are irradiated are respective parts of adjacent grooves.

* * * * *